United States Patent

[11] 3,568,793

[72] Inventors Victor Millman;
   Remo Tontini, San Diego, Calif.
[21] Appl. No. 860,974
[22] Filed Sept. 25, 1969
[45] Patented Mar. 9, 1971
[73] Assignee Rohr Corporation

[54] SOUND-SUPPRESSING APPARATUS
   7 Claims, 4 Drawing Figs.
[52] U.S. Cl. ................................................ 181/51,
   239/265.13, 239/265.19, 239/265.33
[51] Int. Cl. ........................................................ F01n 1/14,
   F01n 1/16, B64d 33/06
[50] Field of Search ............................................. 181/43, 51,
   33, 64.1, 33.221, 33.222, 33.05; 239/127.3,
   265.11, 265.13, 265.17, 265.19, 265.23, 265.33

[56] References Cited
   UNITED STATES PATENTS
   3,027,710  4/1962  Maytner ....................... 181/33(.221)
   3,174,282  3/1965  Harrison ....................... 181/33(.221)
   3,495,682  2/1970  Treiber ......................... 181/60X
   FOREIGN PATENTS
   1,436,412  3/1966  France .......................... 181/33(.221)
   1,019,857  2/1966  Great Britain ................. 239/265.33

Primary Examiner—Robert S. Ward, Jr.
Attorneys—Edwin D. Grant and George E. Pearson ABSTRACT: Support means carried by engine housing has pivotal mounting means at aft end. Support means is axially slidable between forward stowed position and aft deployed position. In latter, pivotal mounting means is adjacent to nozzle exit. Noise shield is swingably mounted on mounting means to swing vertically on lateral axis. Shield is elongate and preferably trough shaped to surround jet stream and reflect noise upward. Optimum results require holding shield at suitable angle to intercept expansion boundary of jet stream. Upper or inner surface of shield is formed with leading edge lip contiguous to jet stream at nozzle exit, followed by depressed forward portion, raised intermediate portion and tapered aft portion. Leading edge lip produces Coanda-type attachment to jet stream, depressed portion produces reduced static pressure to urge shield into interception position, and tapered aft portion produces increasing pressure gradient to oppose effect of forward portion and trim shield to position for optimum thrust and noise attenuation. When support means is stowed, shield is carried forward to stow in streamlined relation to engine housing.

PATENTED MAR 9 1971

3,568,793

INVENTOR.
VICTOR MILLMAN
REMO TONTINI
BY
Edwin D. Grant

SOUND-SUPPRESSING APPARATUS

BACKGROUND OF THE INVENTION

This invention lies in the field of sound suppression of gas turbine or jet engines, which produce reaction thrust by ejecting a high-velocity stream of gas from the exhaust nozzle or tailpipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low-flying airplanes, as during takeoff and climb, at an energy level which is not acceptable to the public.

The invention is directed to a system in which that portion of the noise which produces objectionable effects at ground level is largely prevented from being emitted downward while no control is exercised over the noise which is radiated upward. It is directed particularly to a system which acts to reflect the objectionable noise upward and which will function just as effectively with a simple nozzle as with one which is equipped with other sound suppression devices. Various schemes have been proposed which make use of sound reflection to some extent but they have generally failed because the reflector function was only a small part of a complicated apparatus or because they were so designed and constructed that they were not capable of reflecting more than a minimal amount of the objectionable noise.

The present invention provides a very satisfactory solution to the problem with a limited amount of equipment and very few moving parts requiring repair, maintenance, or adjustment. Generally stated, the system includes a support and guide track carried by the engine housing, support means axially movable on the track and having pivotal mounting means at the aft end, and a noise reflector and suppressor shield pivotally connected adjacent its forward end to the pivotal mounting means for swinging vertically on a generally horizontal lateral axis. When the support means is rearwardly deployed the pivotal mounting means is in the vicinity of the nozzle exit, and the shield trails behind.

The shield is elongate and preferably troughlike and upwardly concave. It is also wide enough to embrace the lower portion of the jet stream at the nozzle exit. The inner or upper surface of the shield is conformed in such manner as to produce a lifting force to urge the shield about its pivot into a position to intercept the expansion boundary of the jet stream, and also a negative force of the proper magnitude to oppose the lifting force and trim the shield to the attitude which will result in optimum thrust and noise attenuation.

In general, the conformation of the upper surface of the shield includes a leading edge lip of predetermined height, followed in turn by a depressed forward portion, a raised intermediate portion, and an aft portion gradually tapering rearwardly to a thin trailing edge. All of the portions are joined or defined by smooth streamlined curved surfaces to reduce turbulence, and a longitudinal cross section is similar to a wall of a venturi tube. When the shield is in operative relation to the nozzle, the rounded leading edge lip is located to define a virtual continuation of the nozzle to cause immediate Coanda-type attachment of the jet stream to the upper surface of the shield.

Since the confirmation described above may not produce sufficient lift to support the shield at least during the initial stage of the takeoff run and noise suppression is important at this as well as later stages, stop means are provided to limit the drop or angular departure of the shield from the jet stream axis to a position somewhat less than the optimum but sufficient to produce significant noise suppression.

It has been determined that sound waves are emitted substantially radially outward from the cone of noise produced by the jet stream so that only the lower half of the cone produces the objectionable ground-directed noise. Since the shield encompasses the lower half, approximately, of the jet stream immediately downstream of the nozzle exit where the noise is initiated, and the stream is forced to flow along its length, the shield is able to reflect upwardly the objectionable sound waves while it is not necessary to control those which are originally directed upwardly. Thus the device functions very well with simple nozzles or with those which have other suppressor devices. The present invention comprises an improvement over the invention disclosed and claimed in the application of Millman et al., Ser. No. 817,018, filed Apr. 17, 1969 and assigned to Rohr Corporation, the assignee of the present application.

BRIEF DESCRIPTION OF THE DRAWINGS

Various other advantages and features of novelty will become apparent as the description proceeds in conjunction with the accompanying drawing, in which.

DESCRIPTION OF PREFERRED EMBODIMENT

Figure 1:
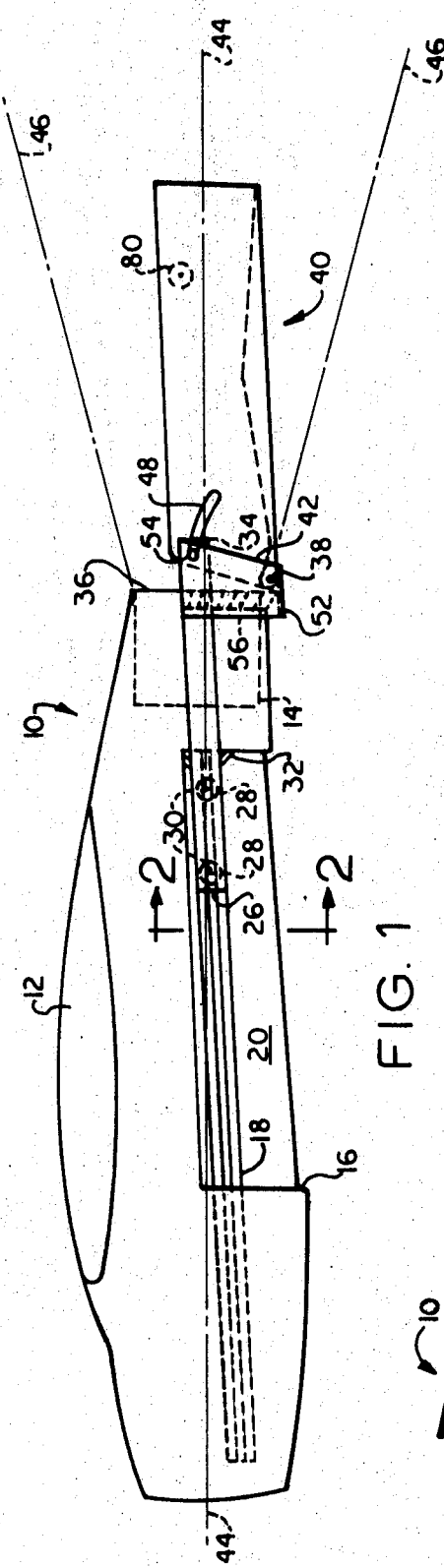
FIG. 1 is a schematic side elevational view of an engine nacelle or housing showing the apparatus of the invention in working position.

The general arrangement illustrated in FIG. 1 shows the apparatus mounted on an airplane in deployed position ready for use in takeoff and climb operation. An engine, not shown, is mounted within nacelle or housing 10, carried by wing 12, and is provided with a tailpipe or nozzle 14 which may terminate in about the same general plane as the aft end of the housing, although this is not essential. a generally semicylindrical opening 16 is formed in the lower part of the housing and is dimensioned to receive the shield and associated parts in a manner to define a streamlined configuration for normal cruising flight. An elongate, generally axially directed support and guide track 18 is mounted on the inner wall 20 of the housing and extends forwardly of opening 16.

Figure 2:
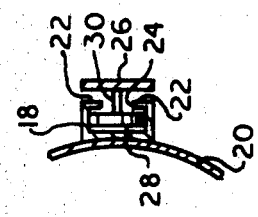
FIG. 2 is a sectional view taken on line 2—2 of FIG. 1.

As best seen in FIG. 2, the track is in the form of a rectangular channel, the web of which is secured by any suitable means to inner wall 20 of the housing. Flanges 22 define a narrow elongate slot 24 leading into a rectangular guide passage. A support means 26 is formed as a cantilever beam and is provided near its forward end with a pair of longitudinally spaced rollers 28 mounted for longitudinal rolling movement in the guide passage of track 18. The rollers are connected to beam 26 by axles 30 which pass freely through slot 24. Thus the beam may move from its deployed position shown in FIG. 1 to a stowed position at the forward end of track 18. Any suitable means may be provided for moving the beam between its extreme positions of adjustment, such as fore and aft spaced fixed pulleys, a supply and takeup reel, and cables attached to the reel and passing in reverse fashion over the pulleys and attached to an anchorage on the beam. The aft end of track 18 is flared at 32 for a purpose to be described later. It will be understood that the mechanism described above is duplicated on the opposite side of the housing, not shown.

Figure 4:
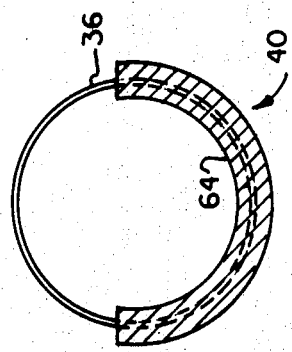
FIG. 4 is a sectional view taken on line 4—4 of FIG. 3.

The elongate reflector-suppressor shield 40 is located in a position extending downstream from the nozzle and at its forward end 42 it is connected to the pivotal mounting means 38 for swinging vertically about a generally horizontal axis transverse to the axis 44 of the nozzle. As shown in FIG. 4 the shield is trough-shaped and concave upward, and is normally generally semicylindrical in cross section so that it may fit in streamlined manner in opening 16 of housing 10 when stowed. Preferably the shield is so dimensioned that it will surround the lower half of the expansion boundary 46 of the jet stream and reflect upward the major portion of the noise emitted thereby. It has been determined that excellent results are obtained when the length of the shield is four to six times the diameter of the nozzle.

The shield 40 is provided at the upper forward corners of its sidewalls with arcuate slots 48. The sidewalls move freely between the aft ends 34 of the beams and the aft end of semicylindrical plate 52, and cross pin 54 fits slidingly in each slot 48. The shield is free to swing upwardly through a substantial angle with respect to the axis 44 of the nozzle. Its downward movement or "drop" is limited by contact of pins 54 with the forward ends of slots 48. Preferably the parts are so dimensioned that the shield will be held, for at least the initial stage of the ground run, at an angle slightly lower than the optimum to allow for adjustment at higher speeds, but high enough to provide significant noise suppression.

Since the shield walls are within the outline of plate 52, there is no gap created as the shield swings on its pivot. A series of overlapping vanes 56 are provided at the aft end of housing 10, and they may be swung radially outward to contact the inner surface of said plate adjacent the forward edge thereof to close the gap between the plate and the outer wall of the housing.

Figure 3:
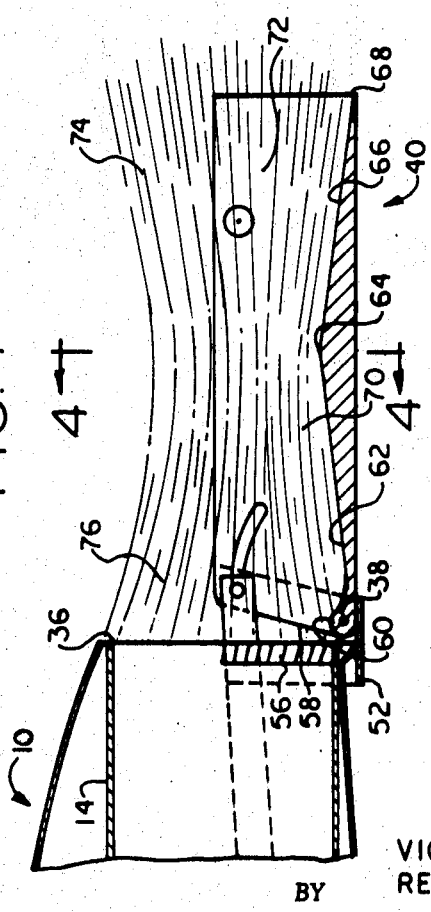
FIG. 3 is a schematic longitudinal sectional view of a nozzle and shield illustrating the mode of operation.

The attitude of the shield is controlled by its location and the conformation of its inner or upper surface. The arrangement and mode of operation are schematically illustrated in FIG. 3. Pivotal mounting means 38 is slightly below and aft of the lowermost part of nozzle exit 36. The leading edge of the shield is formed as a rounded lip 58 of predetermined height having an upper surface 60 which is a virtual continuation of the wall of nozzle 14 so that it is contiguous to the issuing jet stream and causes immediate Coanda-type attachment of the stream to the shield surface. The lip is followed in order by a depressed forward portion 62, a raised intermediate portion 64, and an aft portion 66 which gradually tapers to a thin trailing edge 68. The general appearance is similar to a wall of a venturi tube.

With this construction, the issuing jet stream attaches to the upper surface and flows along it with minimum turbulence. The depressed portion 62 creates a zone of decreased static pressure at 70 resulting in an upward force which urges shield 40 angularly upward to intercept the expansion boundary of the jet stream. The tapering aft section creates a zone 72 of increasing pressure gradient which opposed the upward force and trims the shield to the desired position for favorable noise attenuation and thrust. Dimensions and proportions cannot be stated because they vary with installations on engines of varying power and other characteristics, but the basic principles of construction and operation remain the same in all cases. It will be noted that the turbulent mixing region 74 beyond core region 76 is in the upper portion of the stream, and the noise emitted upward does not produce any objectionable effects on the ground.

Referring again to FIG. 1, the normal expansion boundary of a jet stream from a simple nozzle is typically as indicated by lines 46. The preponderance of the high level noise developed by the jet stream is initiated in a short distance downstream of the nozzle and produces a cone of noise having a substantially larger included angle than that of the jet stream boundary. As stated above, it has been determined that the noise radiates outwardly from this cone so that when the axis of the cone is generally horizontal the upper half radiates its noise in an upward direction which is not objectionable. By interposing the shield of this invention below the source of the downwardly directed noise it is possible to reflect the emitted sound waves upwardly along with those emitted from the upper half of the noise cone. The shield is preferably trough-shaped because during ground run the horizontal emanations are objectionable and in the air it eliminates the downward component of the almost horizontal emanations.

It has been found that to achieve optimum results the shield must intercept the normal expansion boundary of the jet stream and attach to the stream in accordance with the well known Coanda effect, so that the lower portion of the stream is confined and issues axially from the aft end of the shield. As also previously mentioned, the majority of the noise is reflected upward when the length of the shield is from four to six times the nozzle diameter, or the equivalent diameter of a modified nozzle. These conditions are met by the very simple mechanism disclosed herein.

For stowing purposes the entire movable structure is translated forwardly on rails 18 until shield 40 and curved plate 52 fit within opening 16 of housing 10 in streamlined manner. The shield is provided near its aft end with rollers 80 located inwardly of the wall in general fore and aft alignment with rollers 28. As the shield approaches stowed position, roller 80 on each side enters the aft end of track 18, this being facilitated by the flared portion 32 which accommodates vertical misalignment. The supporting effect of roller 80 takes the cantilever load off beam 26 during normal flight.

A simple beam construction for stowing and deploying the suppressor means has been shown for clarity of illustration. A relatively longer shield may be used when mounted on multiple tracks similar to file drawer guide rails. A suitable multiple track arrangement for mounting the suppressor of this invention is illustrated and described in the application of Millman et al. cited above.

We claim:

1. Sound-suppressing apparatus for use in combination with an aircraft propelled by a jet engine, comprising: a housing surrounding a jet engine having a rearwardly discharging jet nozzle; support means carried by said housing and provided with pivotal mounting means; and an elongate noise-reflecting and suppressing shield pivotally connected adjacent its forward end to said pivotal mounting means for swinging about a generally horizontal axis transverse to the axis of the nozzle and with the center of its forward end in the vicinity of the lowermost portion of the nozzle exit; said shield being swingable to intercept the expansion boundary of the jet stream issuing from the nozzle; said shield extending generally horizontally rearward in flight attitude, and its upper surface being conformed to coact with the jet stream from the nozzle to cause the shield to achieve and maintain the optimum interception attitude.

2. Apparatus as claimed in claim 1; the conformation of the upper surface of the shield including a leading edge lip adjacent to the exit margin of the nozzle and contiguous to the jet stream followed by a depressed forward portion to produce a reduced pressure area for urging the shield into intercepting relation with the jet stream.

3. Apparatus as claimed in claim 2; the depressed portion being followed in sequence by a raised portion intermediate the ends, and an aft portion gradually tapering rearwardly to a thin trailing edge; all of said portions being joined by smooth streamlined curved surfaces to reduce turbulence; the aft portion serving to produce an increase in pressure gradient and achieve the desired interception attitude.

4. Apparatus as claimed in claim 3; the transverse pivotal axis of the shield being adjacent to the lowermost portion of the nozzle exit margin.

5. Apparatus as claimed in claim 3; said shield being generally trough-shaped in cross section and upwardly concave and of sufficient width to surround the lower portion of the jet stream at the nozzle exit.

6. Apparatus as claimed in claim 5; the leading edge lip of the shield being formed and located to define a virtual continuation of the nozzle and cause immediate Coanda-type attachment of the jet stream to the upper surface of the shield.

7. A method of controlling the attitude of a reflector-suppressor shield pivotally mounted at the aft end of a jet nozzle to trail rearwardly therefrom, comprising: exposing the upper surface of the shield to the rearward flow of the jet stream from the nozzle; reducing the static pressure on the forward portion of said upper surface to urge the shield into a position to intercept the expansion boundary of the lower portion of the jet stream; and increasing the pressure gradient on the aft portion of said upper surface to a predetermined extent to maintain the shield in an attitude for optimum thrust and noise attenuation.